Figure 1:
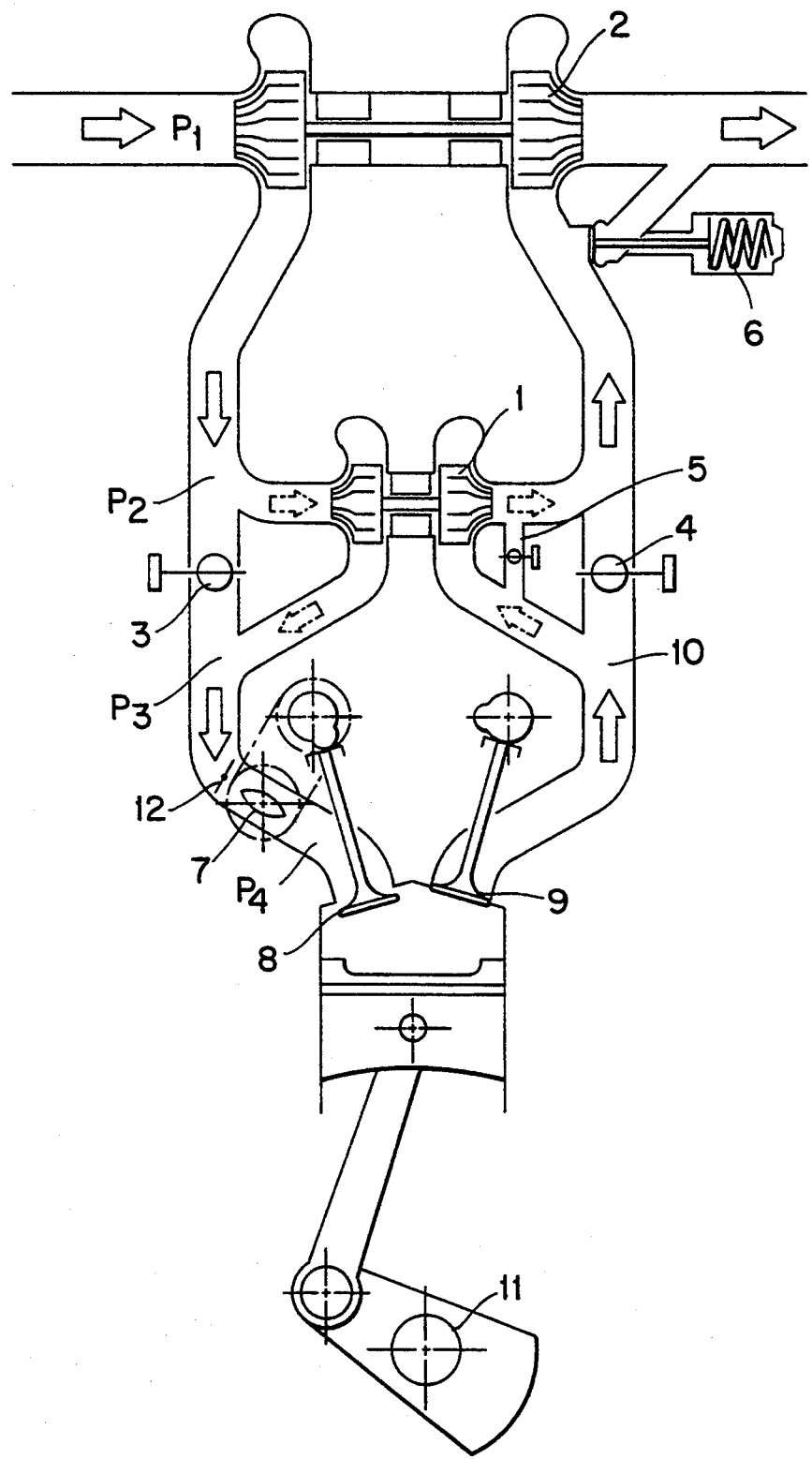

United States Patent [19]
Backlund et al.

[11] Patent Number: 5,408,979
[45] Date of Patent: Apr. 25, 1995

[54] METHOD AND A DEVICE FOR REGULATION OF A TURBO-CHARGING DEVICE

[75] Inventors: Ove Backlund, Vastra Frolunda; Mats Dahlgren, Stockholm; Jan-Erling Rydquist, Kullavik; Lars Sandberg, Gothenburg, all og, Sweden

[73] Assignee: AB Volvo, Gothenburg, Sweden

[21] Appl. No.: 14,101

[22] Filed: Jan. 15, 1993

[30] Foreign Application Priority Data

May 15, 1990 [SE] Sweden .................................. 9001758

[51] Int. Cl.⁶ .............................................. F02B 33/00
[52] U.S. Cl. ...................................... 123/562; 60/602; 60/612
[58] Field of Search .................. 123/562; 60/612, 602, 60/600

[56] References Cited

U.S. PATENT DOCUMENTS

| | | |
|---|---|---|
| 3,576,102 | 4/1971 | West . |
| 3,906,729 | 9/1975 | Connor et al. ......................... 60/612 |
| 4,930,315 | 6/1990 | Kanesaka ............................... 60/612 |

FOREIGN PATENT DOCUMENTS

| | | | |
|---|---|---|---|
| 0291725 | 12/1986 | Japan ..................................... | 60/612 |
| 0117624 | 5/1991 | Japan ..................................... | 60/612 |
| 4017724 | 1/1992 | Japan ..................................... | 123/562 |
| 0164123 | 6/1992 | Japan ..................................... | 123/562 |
| 2096699 | 5/1985 | United Kingdom . | |

OTHER PUBLICATIONS
English translation Abstract of Japanese No. JP61-291725, Dec. 1986.

*Primary Examiner*—Richard A. Bertsch
*Assistant Examiner*—Charles G. Freay
*Attorney, Agent, or Firm*—Burns, Doane, Swecker & Mathis

[57] ABSTRACT

The present invention relates to a device regulation of turbo-charging in an internal combustion engine. The turbo-charging regulation includes a first turbo unit and a second turbo unit each including appropriate turbines and compressors arranged sequentially on the exhaust and the intake sides of the engine. An engine rotational speed sensor is provided issuing a signal indicating the rotational speed of the engine. In addition, at least one pressure sensor issuing a signal indicative of an engine pressure level on the intake side of the engine is also provided. A first valve is associated with the first turbo unit and arranged to direct the engine combustion gases toward the turbine of the first turbo unit in a closed state and to direct the engine combustion gases past the turbine of the first turbo unit in an open state. A second valve is associated with the second turbo unit and arranged to direct the engine combustion gases toward the turbine of the second turbo unit in a closed state and to direct the engine combustion gases past the turbine of the second turbo unit in an open state. A central control unit is arranged to control the actuation of the first and second valves in response to signals from the rotational speed sensor and the at least one pressure sensor to provide a continuous transition between the operation of the first turbo unit and the second turbo unit.

9 Claims, 3 Drawing Sheets

METHOD AND A DEVICE FOR REGULATION OF A TURBO-CHARGING DEVICE

This application is a continuation application of PCT/SE91/00340, filed May 15, 1990, which designates the United States.

The subject invention concerns a method for regulation of a turbo-charging device of the kind comprising a first and a second turbo unit. The invention also concerns a device for effecting such regulation.

The demands on future engines will increase as concerns less fuel consumption, reduced exhaust emission, lighter weight, reduced space requirements, longer life and increased power concentration. One way of obtaining this is to use a smaller stroke-volume, supercharged engine instead of a larger aspirating engine.

By using alternative fuels, preferably engine-grade alcohol of methanol (M100 alternatively M85 where 100/85 conventionally indicate the proportion of methanol in the fuel), it becomes possible to make use of the properties of the high octane number of these fuels in order to increase the compression ratio of the engine for higher efficiency. Furthermore, in a supercharged engine the charging pressure may be increased without resulting in uncontrolled combustion (knocking). Of particular interest is the possibility to increase the amount of supercharge at low rotational speeds, as well as the response, to achieve higher torque. This is normally not possible in conventional engines on account of the risk of knocking when petrol is used as fuel.

In-line engines, for example (other cylinder configurations are also possible), of combustion type which preferably are fuelled by methanol (M100 or M85) offer unique possibilities to combine well-functioning turbo-charge conditions with excellent fuel economy and reduced exhaust emission.

In sequentially arranged turbo-supercharge devices it is possible to obtain optimal efficiency conditions within a wide range of rotational speeds. A small turbo unit configured to be efficient at low rotational speeds may be combined with a larger unit which is adapted primarily for higher rotational speeds, up to the level of the full-power range of the engine.

By using methanol fuels as well as more efficient charging, the gas mixture and the cylinder are heated to less high levels and the formation of nitrogen oxide compounds (NOx-compounds) is reduced.

By means of electronically controlled charging, it becomes possible to outline the charging pressure level for both methanol fuel and pure petrol operational conditions (lower charge pressure on account of the lower octane number). If a fuel consumption sensor is also used it also becomes possible to register and make use of the intermediary fuel mixture (qualities/octane number), and the charging pressure level may be adjusted to the possibilities of each individual fuel qualities.

Controlled charging to approach a torque-related set value, the use of methanol fuels and of sequential turbo-supercharging combine to provide high torque throughout practically the entire range of rotational speeds. In this way, performance characteristics may be obtained, allowing a large aspiration engine to be replaced by a supercharged engine of equal power, as outlined above. The advantages obtained are that the engine operates under a higher specific load for a given load output, with consequential reduced pumping losses and fractional losses. The result is improved specific fuel consumption and lower absolute consumption (corresponding to the smaller engine, since the basic compression may remain slow on account of the octane number of the methanol fuel).

With the aid of torque-controlled regulation (set value as a function of the number of revolutions) and of regulating valves of a particular design, transition from the small turbo unit to the larger one may be made without dips in the charging pressure and in the torque.

In-line engines also provide unique favourable possibilities for incorporating sequential supercharging by means of installing one small and one larger turbo unit having short exhaust and air ducts in a highly compact manner.

The invention comprises a method and a device for regulation of turbo-charging devices and is characterized by the features defined in the characterizing clauses of claims 1 and 2.

Figure 2:
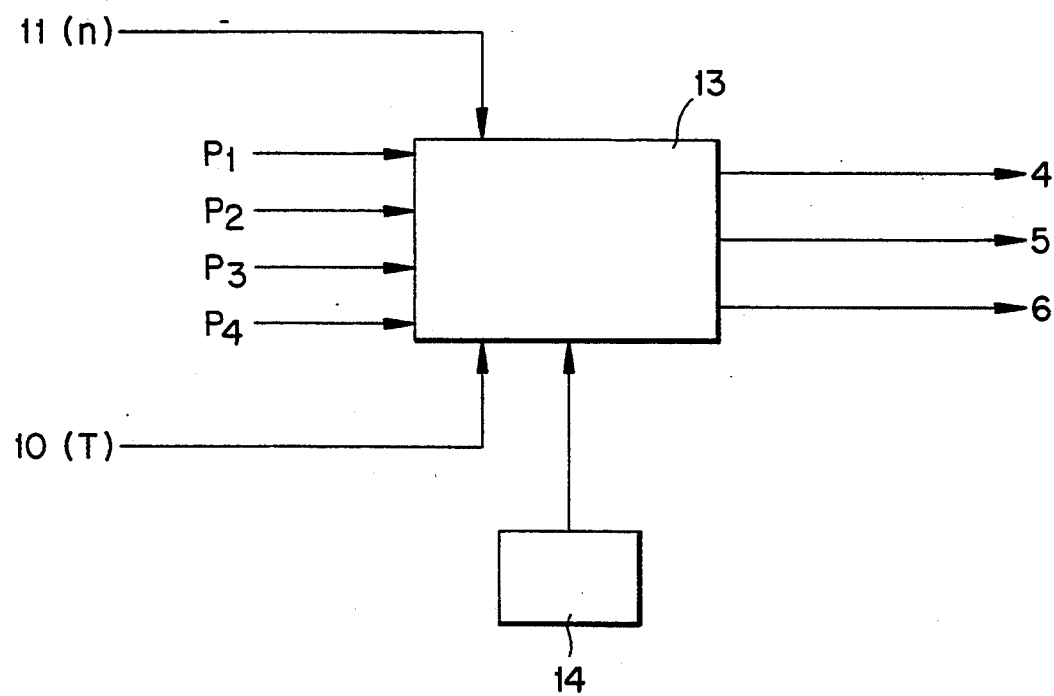
Figure 3:
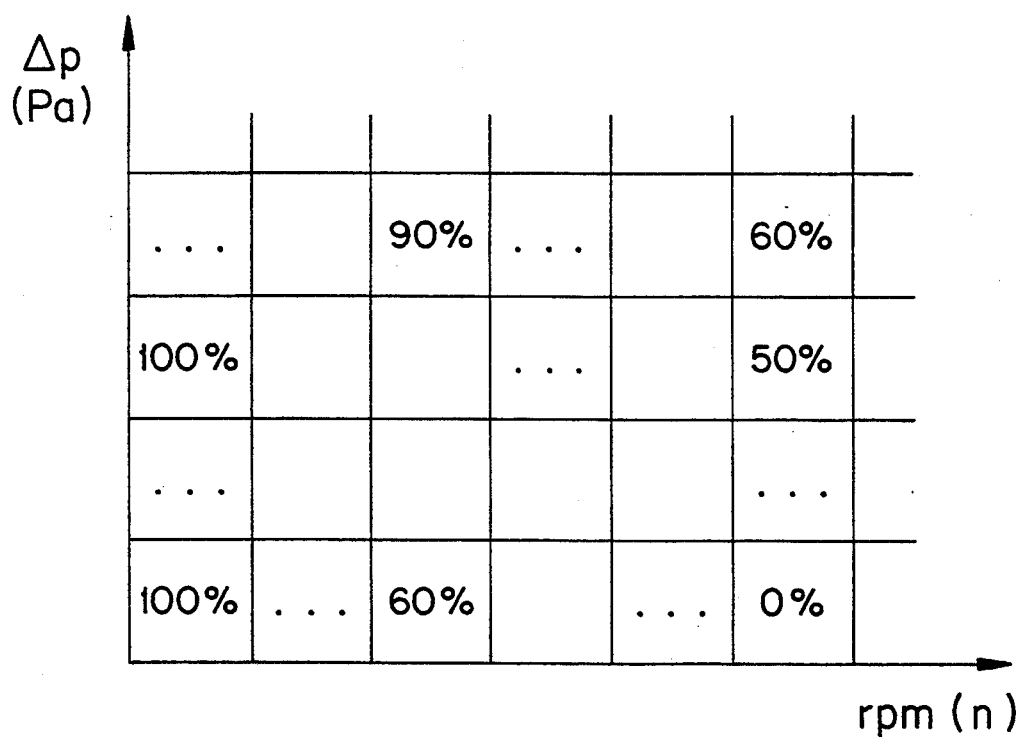
Figure 3:
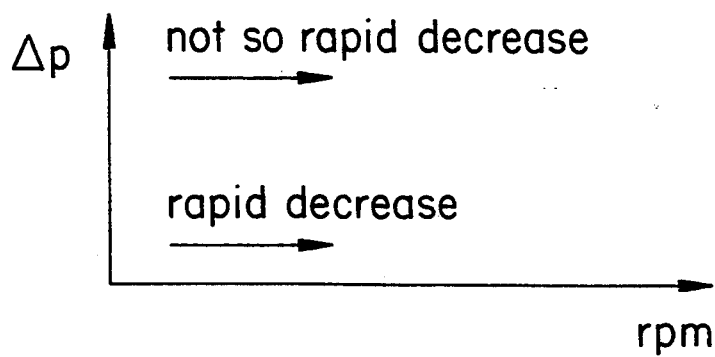

The invention will be described in closer detail in the following with reference to a preferred embodiment and to the accompanying drawings, wherein FIG. 1 illustrates schematically the structural design of a turbo unit operating in serial sequence, FIG. 2 is a block diagram of the regulating system of the invention, and FIG. 3 shows the principle of control of the two turbo units.

FIG. 1 illustrates a turbo-charging arrangement in accordance with the invention. It comprises a first turbo unit 1 and a second turbo unit 2, the latter one being larger than the first one. However, the size difference is not necessary. On the air intake side of the unit is provided a first regulating valve 3 which may be electronically controlled but which in this case is a non-return valve. On the exhaust side is provided a second, electronically controlled regulating valve 4.

A first waste-gate valve 5 is provided in the first turbo unit 1, and in the second turbo unit a second waste-gate valve 6, both of which are electronically controlled.

Closely adjacent the induction duct of the engine a rotary intake valve 7, which valve is controlled in response to the function of the "ordinary" valve 8. In the customary manner, an exhaust valve 9 is provided at the cylinder head. It goes without saying that the invention may be used in engines having more than one exhaust and one intake valve per cylinder.

Numeral reference 10 designates a sensor designed to measure the temperature of the exhaust gases. In addition, numeral reference 11 designates a revolution counter 11, and numeral reference 12 indicates the ordinary throttle valve.

FIG. 2 illustrates in the form of a block diagram a regulating system intended for the subject invention. It comprises a control unit 13 which in the customary manner is provided with a micro processor, a memory unit and input and output means for control of various parameters of the process. To the control unit 13 are coupled connections for input and output signals. The input signals represent the magnitudes of four different pressure signals p1, p2, p3, and p4. How to define these pressures is shown in FIG. 1. The different pressures are measured with the aid of four different pressure sensors (not shown) of a conventional type which are positioned on the air side of the device in the positions indicated by references p1, p2, p3, and p4, respectively (see FIG. 1).

To the control unit 13 are likewise connected the revolution counter 11, the exhaust temperature sensor 10 and an indicator 14 which is positioned in the fuel system (not shown) to provide information on the fuel quality. The indicator 14 issues a continuous signal, indicating the proportion of methanol in the fuel mixture.

From the control unit 13 output signals are emitted to the regulating valve 4, the first waste-gate valve 5 and to the second wast-gate valve 6.

Optionally, a heat exchanger may be provided somewhere on the air side of the turbo device.

The regulation of the turbo charging pressure will be described in the following in closer detail. When the rotational speed of the engine is low (the engine may be an in-line engine, a V-engine, a diesel engine, a Wankel engine or other type of internal combustion engine), the first (smaller) turbo unit 1 will be operated to reach the desired charging pressure. This is desirable, since the smaller unit requires a comparatively low gas flow to achieve a high efficiency rate. In order to operate only the first turbo unit 1 (at low rotational speeds), the first regulating valve 4 must be kept closed while the second waste-gate valve 6 is maintained in open position. This process is governed by the control unit 13 with the aid of a computer program of a kind known to the expert in the field.

When the pressure differential "set value minus actual value of pressure p4" is regulated and, simultaneously, the rotational speed n of the engine increases, a continuous "transition" takes place, whereby the operation of the first unit will gradually decrease while the second, larger turbo unit 2 will "take over" and be operated to an increasing extent.

In the extreme situation, involving a high rotational speed and a large difference between the set value and the actual value of pressure p4, the small unit 1 will "compensate" for this pressure differential and to some extent be operated concurrently with the operation of the second unit 2.

The manner in which the two turbo units 1, 2 will be operated may be illustrated with the aid of a diagram of the type illustrated in FIG. 3. The percentages illustrate the "proportion" (of 100%) of the turbo function that will apply to the first unit 1 as a function of the rotational speed n and the difference between set/actual values of the pressure.

Owing to the subject invention, a high efficiency rate of the turbo function is achieved over a very large range of rotational speeds. An increase of the response (i.e. how quickly the pressure build-up occurs) is likewise obtained.

With the aid of the fuel quality indicator 14 it becomes possible to control the amount of charge of the turbo units by calculating the set values of the charging pressure on the basis of the actual fuel composition at each instant. Once the set value has been established, the table of FIG. 3 is used as a guide for selection of which unit, 1 or 2, to be given priority. It should be pointed out that the invention is particularly well suited for use in connection with fuels containing methanol. By using commmonly known sensors it becomes possible to register continuously for instance the percentage of methanol in petrol (or vice versa).

As regards the regulation of the set value of a turbo unit as such, i.e. the control of the valves 5 and 6, reference is made to the Swedish Patent 8101119-9 entitled "A device for control of the charging pressure in a turbo-charged internal combustion engine".

Upon transition between operation of the first unit 1 and operation of the second unit 2 the following applies. Before the valve 4 is opened, a check (with regard to the duty-cycle of the valve 6) is made to establish whether the unit 2 has enough power to operate the engine at the desired pressure. The set value of the unit 2 is then increased by an amount equalling the existing pressure across the first unit 1 while at the same time the valve 4 begins to open. These operations are time-controlled. During the opening movement of the valve 4 the counter-pressure on the engine is reduced, for which reason the set value of pressure p4 is reduced in order to maintain the output torque of the engine. In this manner, a successive transition from one unit 1, 2 to the other is achieved (i.e. when the valve 4 opens) without alteration of the engine torque.

One possible embodiment of the invention may be used in connection with the so called Atkinson/Miller process.

We claim:

1. A device for turbo-charging regulation in an internal combustion engine, comprising a first turbo unit and a second turbo unit, each of the turbo units including a turbine and compressor, the turbines and compressors of the turbo units being sequentially arranged on exhaust and air intake sides of the engine, respectively, each compressor being arranged in a single air intake pipe, an engine rotational speed sensor issuing a signal indicating the rotational speed of the engine, at least one pressure sensor issuing a signal indicating at least one existing engine pressure level on the intake side of the engine, and a central control unit to which the rotational speed sensor and the at least one pressure sensor are connected, a first valve associated with the first turbo unit and arranged to direct the engine combustion gases towards the turbine of the first turbo unit in a closed state and to direct the engine combustion gases past the turbine of the first turbo unit in an open state, a second valve associated with the second turbo unit and arranged to direct the engine combustion gases towards the turbine of the second turbo unit in a closed state and to direct the engine combustion gases past the turbine of the second turbo unit in an open state, the central control unit being arranged to control the actuation of the first and second valves in response to signals from the sensors rotational speed sensor and the at least one pressure sensor to provide a continuous transition between operation of the first turbo unit and the second turbo unit.

2. A device as claimed in claim 1, wherein the first turbo unit is smaller than the second turbo unit.

3. A device as claimed in claim 2, wherein the central control unit apparatus the first and second valves to utilize only the first turbo unit at a comparatively low combustion gas flow, and to utilize the second turbo unit at a comparatively high combustion gas flow.

4. A device as claimed in claim 1, wherein the second valve is a waste-gate-valve to be selectively opened electrically and controlled by the central control unit.

5. The device according to claim 1, wherein the first valve associated with the first turbo unit is closed a low rotational speeds and second valve associated with the second turbo unit is open at low rotational engine speeds.

6. The device according to claim 1, wherein the first and second valves are independently operated by the central unit.

7. The device according to claim 1, wherein a plurality of pressure sensors are provided along the intake pipe, each pressure sensor being connected to the central control unit.

8. The device according to claim 1, further comprising a fuel quality indicator.

9. The device according to claim 8, wherein the fuel quality indicator sets a value of the at least one pressure indicator.

* * * * *